Figure 1:
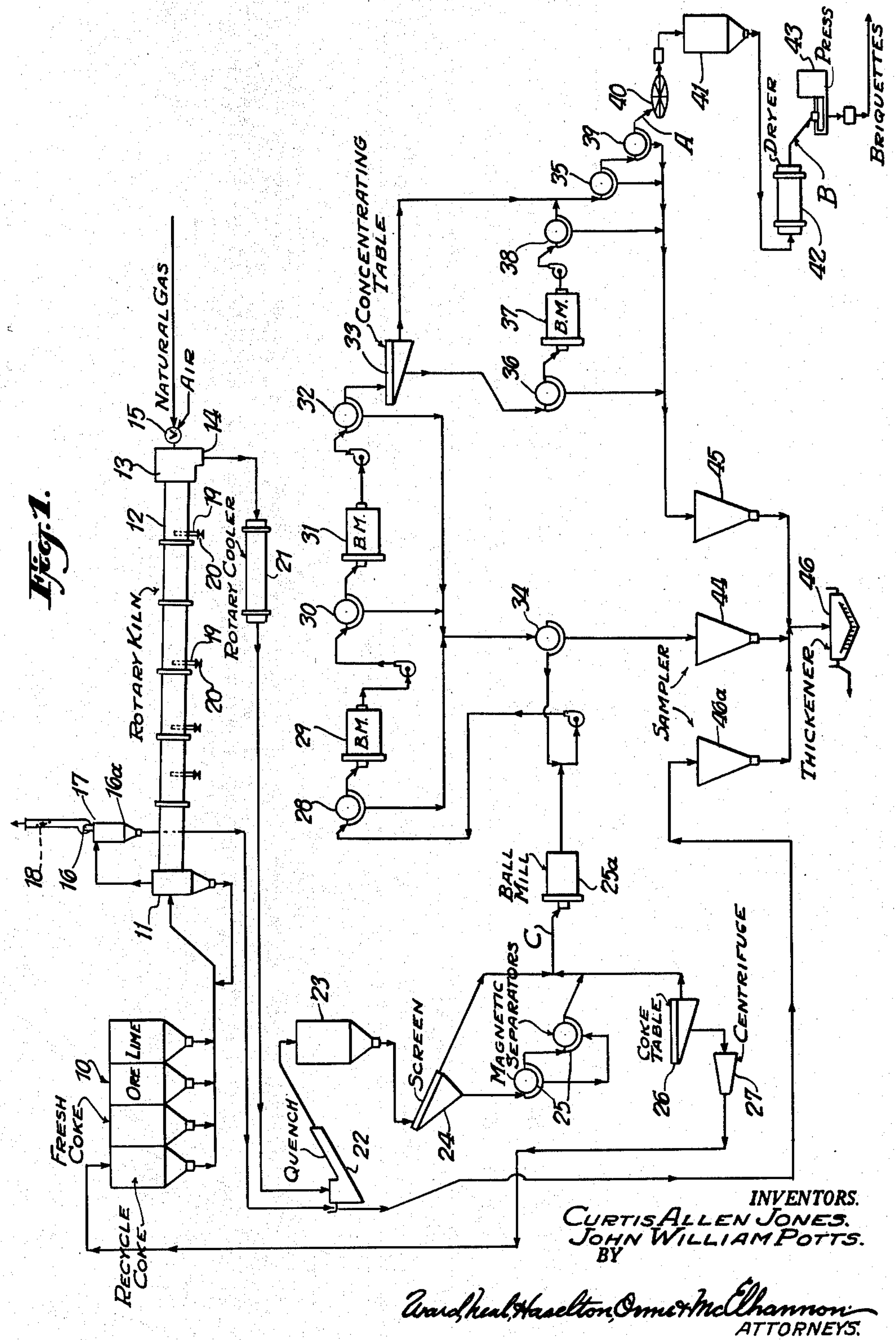

INVENTORS.
Curtis Allen Jones.
John William Potts.
BY
Ward, Neal, Haselton, Orme & McElhannon
ATTORNEYS.

May 25, 1965 C. A. JONES ETAL 3,185,563

METHOD AND MEANS FOR PREVENTION OF RE-OXIDATION OF IRON CONCENTRATES AND THE LIKE

Filed May 17. 1961 2 Sheets-Sheet 2

INVENTORS.
CURTIS ALLEN JONES.
JOHN WILLIAM POTTS.
BY
Ward, Neal, Haselton, Orme & McElhannon
ATTORNEYS.

United States Patent Office 3,185,563

Patented May 25, 1965

3,185,563

METHOD AND MEANS FOR PREVENTION OF RE-OXIDATION OF IRON CONCENTRATES AND THE LIKE

Curtis A. Jones, Fairfield, and John W. Potts, Birmingham, Ala., assignors to R-N Corporation, New York, N.Y., a corporation of Delaware Filed May 17, 1961, Ser. No. 110,813

9 Claims. (Cl. 75—1)

This invention pertains to improvements in methods and means for the low temperature reduction and recovery of metallic iron from its ores or other iron oxide-bearing materials, and has for its objectives the prevention of re-oxidation of the iron during concentration following reduction and also thereafter in shipment and storage.

Iron ore and the like may be directly reduced at low temperature and without fusion by means of gaseous reductants, such as hydrogen, carbon monoxide, natural gas, etc., or by means of solid reductants such as coke, coke breeze, etc., or by combinations of these two, following which the metallic iron is recovered in finely comminuted form by separating and concentrating operations involving screening, tabling, grinding and magnetic separation.

Such concentration may be accomplished while maintaining the reduced ore mass in a dry state, or alternatively, in a wet state. The tendency of the metallic iron to re-oxidize during concentration is, however, inherently less in dry state as compared to wet state processing. In the latter, the iron values are progressively concentrated in a wet slurry of increasingly smaller particle size, from which the iron is ultimately recovered by filtering. During such processing, the iron undergoes appreciable re-oxidation owing to its moist atmospheric environment. With either type of processing, the iron concentrate tends to re-oxidize during subsequent shipment and storage. In order to minimize this and also to facilitate handling, it has heretofore been the practice to press the iron powder concentrate into briquettes. Nevertheless, the re-oxidation is appreciable.

It has been discovered in accordance with the present invention, that re-oxidation of the iron concentrate occurring in any of the ways aforesaid, may be substantially eliminated or greatly reduced by means of certain additives, which may be introduced into the concentrating system at any stage thereof as required, or into the iron powders prior to briquetting, or both, and also by applying to the briquettes, coatings of these additives.

The additives which have been found most effective as oxidation inhibitors for such purposes are, the salts and bases, and preferably the inorganic salts and bases, of the alkali and alkaline earth metals which are alkaline in aqueous solution. The preferred additives are one or more of the following, in small amounts, as specified below, relative to the material processed, i.e., sodium carbonate, $Na_2CO_3$, calcium hydroxide $Ca(OH)_2$ and trisodium phosphate $Na_3PO_4$.

It has been discovered that these additives protect the iron particles against re-oxidation during concentration and subsequent storage, and further that if the iron powders are compacted into briquettes which are coated, as by dipping, with an aqueous solution of one or more of these agents, excellent resistance to surface oxidation is imparted thereto.

While the invention finds general application to iron ore reduction and recovery techniques wherein the iron values are concentrated in the manner aforesaid, it is especially adapted to the progressive and continuous ore reduction processing described in Patent 2,829,042 to O. Moklebust, wherein the ore is progressively reduced in a rotary kiln in the presence of a solid carbonaceous reducing agent such as coke, and in an atmosphere of combustible gases and a limited supply of oxygen such that the reduction is conducted without fusion, at temperatures of about 1000–1100° C., depending on the reducibility of the ore being treated.

With this process the reduced ore is continuously discharged from the furnace and is passed through a water-cooled rotary drum for cooling substantially to atmospheric temperature if dry state concentration is employed, or alternatively, is partially cooled in this manner and then water quenched, if wet state concentration is utilized.

It has been found that re-oxidation of the iron occurring during dry state concentration, is sufficiently slight that the oxidation inhibitor need in general be introduced only into the final iron concentrate just prior to briquetting for subsequent protection in shipment and storage, in conjunction with which a protective surface coating of the additive is also preferably applied.

With wet state concentration, however, appreciable re-oxidation of the iron concentrate occurs at all stages of concentration, and particularly during the final stages of filtering and briquetting. Introduction of the additive prior to the first stage of grinding has therefore been found highly effective, although good results are obtained by introducing the inhibitor just prior to filtering. Best results are obtained by adding the inhibitor at both points, prior to filtering to offset losses of the inhibitor occurring in the earlier stages of concentration.

Figure 2:
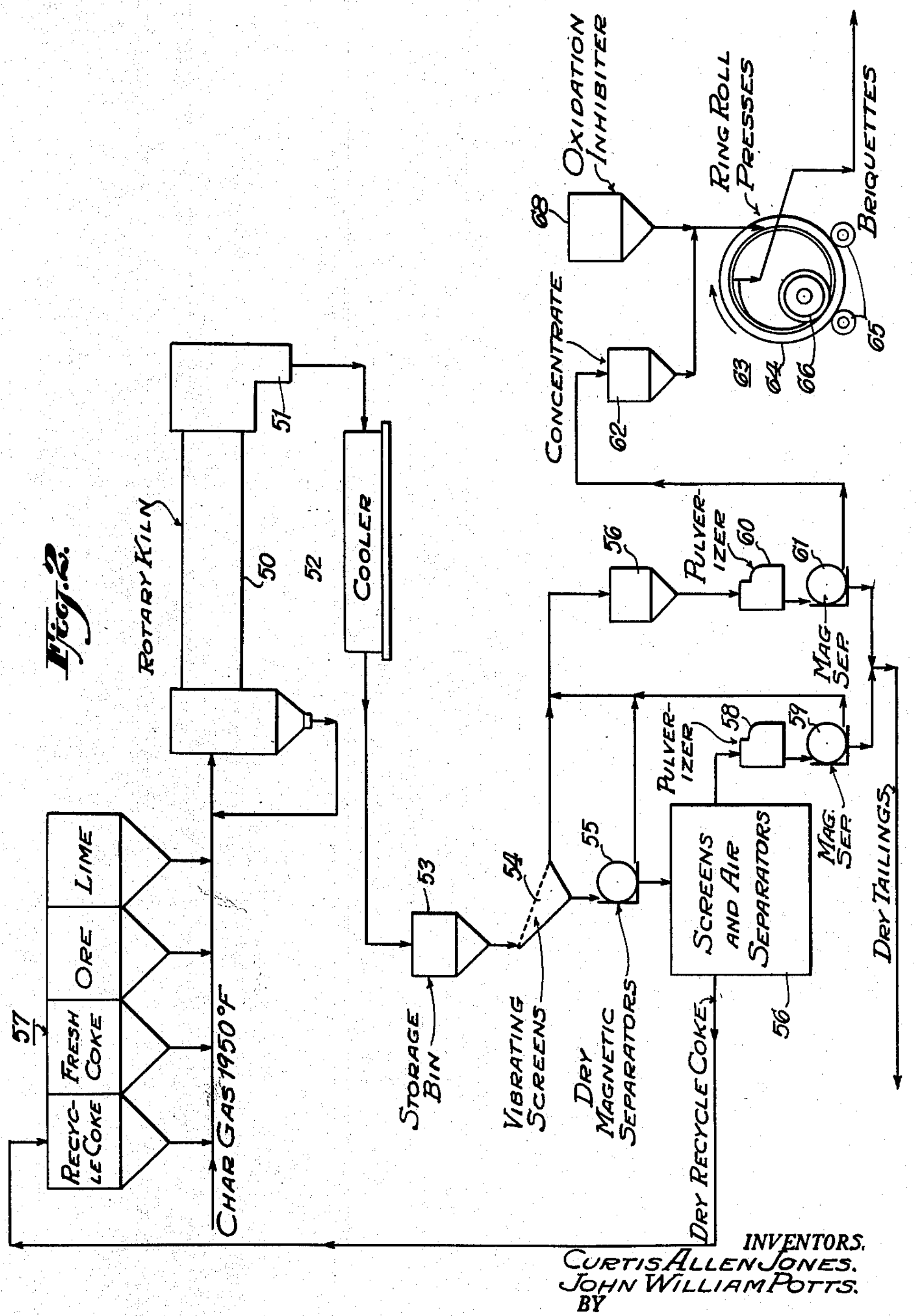

Having thus described the invention in general terms, reference will now be had for a more detailed description to the accompanying drawing wherein:

FIG. 1 is a flow sheet of an ore reduction and wet state concentrating system in accordance with the invention; and FIG. 2 is a similar flow sheet employing dry state concentration.

Referring to FIG. 1, iron ore and coke, together with limestone if required, are fed from bins 10 through the feed end housing 11 of a rotary kiln furnace, and thence into the rotary kiln unit 12 through which the charge progresses during reduction to the delivery end housing 13, from whence the reduced ore is discharged, as at 14. The delivery end housing is provided with a burner 15, for introducing a fuel, such as natural gas, and a limited amount of air, insufficient to completely burn the fuel.

The gas flow is countercurrent to the ore-coke feed, passing out of the stack 16 through a dust collecting cyclone 16*a*, the stack being provided with an exhaust fan 17, and damper 18, for regulating the draft. As described in said Moklebust patent, the kiln is penetrated by spaced air tubes, as at 19, extending to the kiln axis and opening thereat in the axial direction of the kiln indicated. The exterior ends of these tubes mount air inlet valves, as at 20, for regulating the temperature and combustion conditions throughout the kiln, as described in said patent for effecting optimum reduction without fusion.

The reduced ore discharged 14, is fed through a water-cooled rotary drum 21, and from thence is water quenched in a tank 22. It is then conveyed to a storage bin 23 from the base of which it is fed onto a screen 24, the fines through which are magnetically concentrated by the magnetic separators 25, the magnetic or metallic iron containing fraction from which is fed thence to a ball mill 25*a*, to which the coarse reject from the screen is also fed. The non-magnetic residue from the separators 25 is fed to a coke table 26. The coke fraction thus separated is recycled through a centrifuge 27 to the recycle coke bin at 10, while the gangue residue is fed to the ball mill 25a.

The output from the ball mill 25a is fed to a magnetic separator 28, the iron concentrate from which is fed thence successively to ball mill 29, magnetic separator 30, ball mill 31 and magnetic separator 32, and thence to a concentrating table 33. The tailings fraction from separators 28, 30 and 32 is fed to a magnetic separator 34, the iron concentrate from which is recycled through the grinding and separating system 28–32, inc.

The iron concentrate from table 33 is fed to a magnetic separator 35, while the residue is fed thereto through the separating and grinding circuits 36, 37, 38. From separator 35 the iron concentrate is fed to the magnetic separator 39, thence to a filter 40 for dewatering and recovery of the metallic iron concentrate, which is conveyed thence into a storage bin 41, from the base of which it is passed through a dryer and into a hydraulic press wherein it is pressed into briquettes. The tailings from the separators 34–36, 38 and 39 are fed to the measuring cones 44, 45, and thence into a settling tank 46. Also the dust from collector 16a is fed to the settling tank through a cone 46a.

A pilot plant located at Birmingham, Alabama, constructed and operating in accordance with the flow sheet drawing, as above explained, was employed in order to demonstrate the effectiveness of the various additives above mentioned in inhibiting re-oxidation of the metallized iron from ore reduced and concentrated in accordance therewith, with results as follows:

EXAMPLE I

The pilot plant was operated in the reduction and processing of a typical iron ore until steady state conditions were attained. At that stage the percent metallization of the iron was determined at points A and B of the drawing (i.e., prior to filtering and briquetting, respectively), and found to be 94.6% at point A and 93.2% at point B, thereby establishing that there had occurred a loss in metallization due to re-oxidation between these two points of 1.4%.

An additive consisting of 2 parts of calcium hydroxide and 1 part of sodium carbonate by weight was then continuously introduced into the system at point A in the proportion of 1.3% by weight of the additive to the weight of the iron in the slurry and the percent metallization at points A and B again determined and found to be 95.9 and 95.4%, respectively, or a loss due to re-oxidation between these points of only 0.5%, or approximately only one-third that occurring without the additive.

EXAMPLE II

In a similar test with no additive present, the percent metallization was again checked at points A and B and found to be 93.8% and 92.2%, respectively, showing a loss in metallization due to re-oxidation between these points of 1.6%. An additive consisting of a mixture of sodium carbonate and trisodium phosphate on a 5:1 weight ratio basis, was then introduced into the slurry at point A in amount of 0.7% by weight on the basis above stated, and after steady state conditions had attained, the percent metallization at points A and B was again determined and found to be 96.9% and 95.7%, respectively, the loss due to re-oxidation being 1.2%, again substantially lower than that without the additive.

EXAMPLE III

In a test similar to that of Example II, but in which the additive was introduced at point C of the system as shown in the drawing (i.e., just ahead of the first grinding stage) and the loss in metallization between points C and A without the additive was found to be 2.2% due to reoxidation. With the same additive as in Example II and added in the percentage stated therein, the loss in metallization between points C and A was found to be only 1.3%, a substantial improvement over the above results obtained without the additive.

In order to determine the loss in metallization through rusting due to atmospheric exposure of briquettes made of the iron concentrate obtained without additives in the pilot run above referred to, but without and with protective coatings thereof, the following experiments were made. A series of cylindrical briquettes were formed by cold pressing the powders under a pressure of 35 tons/in.$^2$, these measuring about 4" in diameter and in height. A series of three briquettes was used for each test, being the product off the pilot mill within a few seconds of each other, thereby eliminating minor differences in composition due to slight variations in pilot mill performance over a period of time. One briquette of each series of three was analyzed for metallization at the start of each test. The other two were then exposed to atmospheric conditions for sixty days, one without any protective coating and the other after having an oxidation inhibiting coating applied, and the metallization after exposure determined. For the various tests the oxidation inhibiting coatings were applied by dipping one of each series of three briquettes into the following solutions, respectively: Test 1, a saturated aqueous solution of sodium carbonate; Test 2, a 1:4 aqueous solution of sodium carbonate by weight; and Test 3, a 1:4 aqueous solution of trisodium phosphate by weight. The test results are tabulated in Table I below.

*Table I*

| Test No. | Briquette | Time, days | Total Fe percent | Metallic Fe percent | Metallization, percent |
|---|---|---|---|---|---|
| 1. Sat. Sol. $Na_2CO_3$ | Uncoated | start | 90.6 | 85.0 | 93.7 |
| | do | 60 | 86.5 | 71.6 | 82.8 |
| | Coated | 60 | 89.7 | 82.2 | 91.7 |
| 2. $Na_2CO_3$ 1:4 Sol | Uncoated | start | 90.1 | 82.2 | 91.2 |
| | do | 60 | 86.8 | 74.4 | 85.7 |
| | Coated | 60 | 87.5 | 78.7 | 89.9 |
| 3. $Na_3PO_4$ 1:4 Sol | Uncoated | start | 90.1 | 82.2 | 91.7 |
| | do | 60 | 86.8 | 74.4 | 85.7 |
| | Coated | 60 | 87.9 | 80.2 | 91.4 |

From the above data it will be seen that the coated specimens were uniformly more resistant to loss of metal and metallization than were the uncoated specimens after prolonged atmospheric pressure.

A further series of tests were made for purposes of determining the resistance to re-oxidation on prolonged atmospheric exposure imparted by incorporating a re-oxidation inhibitor throughout the body of the briquettes. For these tests some of the iron concentrate obtained without additives in the pilot run referred to, was pressed into briquettes. A soda ash additive, i.e., sodium carbonate, was then introduced into the system at point B, i.e., just ahead of the briquetting press, and additional briquettes were thus produced in which the additive was distributed throughout the entire body of each. The soda ash additive was incorporated in these briquettes in amount to provide a sodium content of about 0.1% of the total weight of each briquette. Prior to subjecting the briquettes without the additive and those with the additive to atmospheric exposure, an analysis was made as to the content of total iron and metallic iron and also the percent metallization thereof. The briquettes were then subjected to atmospheric exposure for prolonged intervals during which analyses were made periodically with respect to the above items. The results are summarized in the following Table II:

*Table II*

| | No inhibitors, days of exposure | | | |
|---|---|---|---|---|
| | 0 | 27 | 33 | 40 |
| Total iron | 94.11 | 92.21 | 91.54 | 91.43 |
| Metallic iron | 88.23 | 79.17 | 77.66 | 77.74 |
| Percent metallization | 93.75 | 85.86 | 84.84 | 85.03 |

| | Soda ash inhibitor, days of exposure | | | |
|---|---|---|---|---|
| | 0 | 28 | 35 | 42 |
| Total iron | 95.02 | 94.64 | 93.58 | 94.17 |
| Metallic iron | 90.59 | 89.62 | 88.30 | 87.64 |
| Percent metallization | 95.34 | 94.70 | 94.36 | 93.16 |

From the above data it will be seen that over a period of approximately 40 days of atmospheric exposure, the loss in total iron was about 3% without the inhibitor versus only about 1% with the inhibitor incorporated throughout the body of the briquettes. For the metallic iron content, the loss was about 12% without the inhibitor versus only about 3% with the inhibitor; while for the present metallization, the loss was about 9% without, versus only about 2% with, the inhibitor. The effectiveness of the inhibitor in preventing re-oxidation losses in storage is thus clearly demonstrated.

Referring now to the dry state concentrating flow sheet of FIG. 2, the ore reduction in the rotary kiln 50 is as above described with reference to FIG. 1. The reduced ore discharged from the kiln outlet 51, is passed through the rotary cooler 52, and delivered thence into the storage bin 53, from the base of which it is discharged onto a vibrating screen 54. The fines through the screen are subjected to dry magnetic separation as at 55, the magnetic fraction from which is fed to the bin 56, along with the coarse reject from the screen 54. The reject from separator 55, is fed to a screen and air separator assembly 56, for dry separation of the coke, the coke being fed to the recycle coke bin at 57, and the residue fed to a pulverizer 58, and thence to a dry magnetic separator 59, the magnetic fraction from which is also delivered into the bin 56, while the reject is fed to tailings, as indicated. The material thus fed into bin 56 is fed from its base into a pulverizer 60 and thence through a dry magnetic separator 61, the magnetic fraction from which is delivered into bin 62, while the reject is fed to tailings as indicated. From bin 62, the powdered iron concentrate is fed to a briquetting apparatus, in this case a ring-roller press 63, consisting essentially of an integrally grooved ring 64, rotatably mounted on rollers, as at 65, and within which is rotatably mounted, a flanged roller 66, the flange of which tracks in the ring groove. The press is driven in the direction indicated, while feeding the powdered concentrate into the ring groove on the input side of the roller for pressure molding the same. A prolonged stripper 67, strips the molded material from the groove in briquetted segments.

As above explained, dry state concentration in accordance with the FIG. 2 flow sheet, produces inappreciable re-oxidation of the iron concentrate, and hence does not require addition of an oxidation inhibitor in the concentrating system. However, the inhibitor is required for protecting the concentrate in storage and hence is introduced into the concentrate from a bin 68 just prior to briquetting.

Reverting to the flow sheet of FIG. 1, the oxidation inhibitor introduced into the concentrating system at points A, C or elsewhere, is effective in inhibiting re-oxidation when added in amounts of about 0.25 to 5%, and preferably about 0.5–1.5% by weight of the iron values being concentrated. For protecting the briquettes in storage, the inhibitor should be incorporated throughout the body of the briquette in these same percentages of the total weight of the briquette. Where, however, a sodium salt or base, for example, soda ash, is employed as the inhibitor, it should be introduced into the concentrating system in amount such as to provide a retained sodium content in the briquette of 0.05 to 0.5% and preferably about 0.1 to 0.15% of the total briquette weight. These same proportions apply where potassium salts or bases are used as the inhibitor, as regards the retained potassium content of the briquette.

As regards additional surface protection of the briquettes against rusting, dipping in a saturated aqueous solution of the alkali or alkaline earth metal salt or base is effective, or a solution comprising a 1:4 weight ratio of the salt or base to the water content.

Various other compounds of the aforesaid types which were found to be effective oxidation inhibitors in accordance with the invention, in the proportions above stated, are dibasic sodium phosphate, sodium metasilicate, sodium benzoate, sodium chromate, sodium nitrite and potassium chromate.

The briquettes of the invention find application, among other uses, as melt stock in the production of open hearth or electric furnace steel or steel alloys, during production of which the inhibiting agent either volatilizes off completely during the melting or is otherwise slagged off.

What is claimed is:

1. In a process for recovering and concentrating the metallic iron values from the product formed by the low temperature reduction of iron ore without fusion, the steps which comprise: comminuting said product and concentrating the metallic iron values therefrom by subjecting the comminuted product to magnetic separation and treating said product at a selected stage of said concentration, with about 0.25 to 5% by weight of the iron content, of at least one oxidation inhibiting agent selected from the group consisting of salts and bases of the alkali and alkaline earth metals which are alkaline in aqueous solution.

2. In a process for recovering and concentrating the metallic iron values from the product formed by the low temperature reduction of iron ore without fusion, the steps which comprise: comminuting said product and concentrating the comminuted product by subjecting said product to magnetic separation and treating said product at a selected stage of said concentration with an oxidation inhibiting agent containing a sodium compound of the type which is alkaline in aqueous solution, and in amount such as to provide a retained sodium content in the resulting iron concentrate of about 0.05 to 0.5% by weight of the total.

3. In a process for recovering the metallic iron values from the product formed by the low temperature reduction of iron ore without fusion, the steps which comprise: comminuting said product and subjecting the comminuted product to magnetic separation in an aqueous medium containing at least one oxidation inhibiting agent selected from the group consisting of water-soluble salts and bases of the alkali and alkaline earth metals and in amount effective to inhibit re-oxidation of the metallic iron, dewatering the resulting iron concentrate and briquetting.

4. In a process for recovering and concentrating the metallic iron values from the product formed by the low temperature reduction of iron ore without fusion, the steps which comprise: comminuting said product and subjecting the comminuted product to magnetic separation in an aqueous medium containing a soluble sodium salt in amount to provide a sodium content of about 0.05 to 0.5% by weight in the final iron concentrate, filtering said concentrate and briquetting.

5. As a new article of manufacture, a briquette consisting of iron and iron concentrates, having incorporated throughout the body thereof about 0.25 to 5% by weight of the total, of at least one oxidation inhibiting agent selected from the group consisting of salts and bases of the alkali and alkaline earth metals which are alkaline in aqueous solution.

6. As a new article of manufacture, a briquette consisting of iron and iron concentrates, having incorporated throughout the body thereof about 0.5 to 1.5% by weight of the total, of at least one oxidation inhibiting agent selected from the group consisting of salts and the bases of the alkali and alkaline earth metals which are alkaline in aqueous solution.

7. As a new article of manufacture, a briquette consisting of iron and iron concentrates, having incorporated throughout the body thereof at least one oxidation inhibiting agent selected from the group consisting of salts and bases of the alkali and alkaline earth metals which are alkaline in aqueous solution, said oxidation inhibiting agent containing a sodium compound which is alkaline in aqueous solution and which provides a retained sodium content about 0.05 to 0.5% by weight of the total.

8. As a new article of manufacture, a briquette consisting of iron and iron concentrates, having incorporated throughout the body thereof at least one oxidation inhibiting agent selected from the group consisting of salts and bases of the alkali and alkaline earth metals which are alkaline in aqueous solution, said oxidation inhibiting agent containing a sodium compound which is alkaline in aqueous solution and which provides a retained sodium content about 0.1 to 0.15% by weight of the total.

9. The process of reducing iron ore and concentrating the metallic iron values thereof which consists in: reducing said ore without fusion in the presence of a reducing agent, comminuting the reduced ore, placing the comminuted reduced ore in mixture with an aqueous medium containing about 0.25 to 5% by weight of the iron concentrate of at least one oxidation inhibiting agent selected from the group consisting of salts and bases of the alkali and alkaline earth metals which are alkaline in aqueous solution and concentrating the metallic iron values therefrom by subjecting the particles in said aqueous medium to a magnetic separation process.

References Cited by the Examiner

UNITED STATES PATENTS

| | | | |
|---|---|---|---|
| 1,551,554 | 9/25 | Greiner | 75—44 |
| 2,361,925 | 11/44 | Brassert et al. | 75—200 |
| 2,394,793 | 2/46 | Maier | 75—3 |
| 2,871,115 | 1/59 | Agarwal | 75—3 |
| 2,931,717 | 4/60 | Lee | 75—3 |
| 2,986,460 | 5/61 | Babcock et al. | 75—36 |

DAVID L. RECK, *Primary Examiner.*

MARCUS U. LYONS, ROGER L. CAMPBELL, *Examiners.*